(12) United States Patent
Shen et al.

(10) Patent No.: US 11,932,095 B2
(45) Date of Patent: Mar. 19, 2024

(54) BUCKLE LOCKING MECHANISM FOR THE TONNEAU COVER OF PICK-UP TRUCKS (II)

(71) Applicants: Gai-Lee Shen, Taipei (TW); Chun-Hung Yeh, Kaohsiung (TW)

(72) Inventors: Gai-Lee Shen, Taipei (TW); Chun-Hung Yeh, Kaohsiung (TW)

(*) Notice: Subject to any disclaimer, the term of this patent is extended or adjusted under 35 U.S.C. 154(b) by 0 days.

(21) Appl. No.: 17/564,306

(22) Filed: Dec. 29, 2021

(65) Prior Publication Data
US 2023/0202275 A1 Jun. 29, 2023

(51) Int. Cl.
*B60J 7/10* (2006.01)
*A44B 11/22* (2006.01)

(52) U.S. Cl.
CPC ............ *B60J 7/102* (2013.01); *A44B 11/226* (2013.01)

(58) Field of Classification Search
CPC .............................. B60J 7/102; A44B 11/226
See application file for complete search history.

(56) References Cited

U.S. PATENT DOCUMENTS

| | | | | |
|---|---|---|---|---|
| 7,823,957 B2* | 11/2010 | Williamson | ............. | B60J 7/104 292/DIG. 49 |
| 9,862,257 B1* | 1/2018 | Kozlowski | ............... | B60J 7/198 |
| 10,232,691 B1* | 3/2019 | Weng | ........................ | B60J 7/198 |
| 10,315,498 B2* | 6/2019 | Parkey | ...................... | B60J 7/198 |
| 10,710,437 B2* | 7/2020 | Chen | ........................ | B60J 7/198 |
| 10,919,369 B2* | 2/2021 | Lewis | ...................... | B60J 7/141 |
| 2010/0270824 A1* | 10/2010 | Yue | .......................... | B60J 7/198 296/100.07 |
| 2011/0260493 A1* | 10/2011 | Xu | .......................... | B60J 7/198 296/100.07 |
| 2015/0001877 A1* | 1/2015 | Fink | ........................ | B60J 7/104 296/100.17 |
| 2017/0066311 A1* | 3/2017 | Facchinello | ............ | B60J 7/198 |
| 2017/0197498 A1* | 7/2017 | Facchinello | ............ | B60J 7/106 |
| 2019/0315209 A1* | 10/2019 | Lewis | ...................... | B60J 7/141 |
| 2020/0062095 A1* | 2/2020 | Xu | .......................... | B60J 7/198 |
| 2020/0094660 A1* | 3/2020 | Ma | .......................... | B60J 7/185 |
| 2020/0148046 A1* | 5/2020 | Ma | .......................... | B60J 7/141 |
| 2020/0189368 A1* | 6/2020 | Potter | .................... | B60R 9/055 |

* cited by examiner

Primary Examiner — David M Upchurch (57) ABSTRACT

Provided is a buckle locking device for the tonneau cover of pick-up trucks (II), which mainly comprises a load-bearing cross bar, a slider, a handle, a buckle block, a slide fixing block, a T-bar and an extruded aluminum frame, characterized in that: when the load-bearing cross bar and the slider is pressed by the handle of the buckle locking mechanism for buckling, it can generate a downward pulling force, which can be transmitted by the load-bearing cross bar to force the whole tonneau cover frame to generate a downward pressure, so that it can cover the truck bed tightly. Moreover, through the design of the slider mechanism, the T-bar can offer better stability and better positioning. When the buckle locking mechanism is not used, it can also be hidden inside the groove of the slider.

2 Claims, 11 Drawing Sheets

BUCKLE LOCKING MECHANISM FOR THE TONNEAU COVER OF PICK-UP TRUCKS (II)

TECHNICAL FIELD

The present invention relates generally to a buckle locking mechanism (also referred to as "buckle locking device") for the tonneau cover of pick-up trucks (II), and more particularly to a design that utilizes the downward pulling force generated during the handle buckling. Through the transmission of the slider, the downward pulling force is transmitted to the load-bearing cross bar, and consequently the load-bearing cross bar can also generate a downward pulling force upon the tonneau cover frame, so that the whole tonneau cover frame can be covered on the truck bed more tightly and stably. Moreover, thanks to the design of the slider mechanism, when the buckle locking mechanism is not used, it can be completely hidden inside the slider. Therefore, the design is indeed a unique, innovative, and economically beneficial invention.

BACKGROUND OF THE INVENTION

The ongoing technological advance and industrial development are boosting the market of transportation vehicles. Among them, pick-up trucks are very popular in the market because of their capability to load large-size objects, their high loading capacity, as well as their high horsepower. However, as the truck bed is designed as an open space, related manufacturers have designed a tonneau cover to achieve an enclosed space, and the problem facing the manufacturers is how to ensure tight and stable coverage through a convenient operation.

In view of this, the inventor of the present invention has made in-depth research based on his years of experience in the related field, seeking to find a technical solution to the aforesaid problem. After extensive researches and multiple tests, the present invention was finally completed. The existing problems are solved, and some improvements are implemented to make the product more practical and advanced.

SUMMARY OF THE INVENTION

The main object of the present invention is to provide a "buckle locking mechanism for the tonneau cover of pick-up trucks (II)", featuring combined use of a slider mechanism and a load-bearing cross bar. With the assembled buckle locking mechanism fitted inside the slider, when the handle is driven by the T-bar inside the buckle locking mechanism to slide along the C-shape sliding chute inside the slider until the flange portion on the sidewall of the truck bed, and is turned upward to a preset height, the user just needs to press the handle downward to generate a downward tightening force, and the T-bar will force the slider to generate a downward pulling force. The generated downward pulling force will be transmitted by the slider to the load-bearing cross bar. The load-bearing cross bar mounted on the tonneau cover frame will force the whole tonneau cover frame to generate a downward pressing force, so that the whole tonneau cover frame can be fastened on the truck bed more tightly and stably.

The secondary object of the present invention is to provide a "buckle locking mechanism for the tonneau cover of pick-up trucks (II)", featuring a slider mechanism. When the assembled buckle locking mechanism is not used, it can be hidden inside the groove of the slider to form an integral body.

Provided is a buckle locking device for the tonneau cover of pick-up trucks (II), comprising: a load-bearing cross bar, a slider, a handle, a buckle block, a slide fixing block, a T-bar, and an extruded aluminum frame, wherein the handle is a long bar, with its top end having a U-shape sliding chute, extending downward until an appropriate position to be adjacent to the hand holding portion, wherein the left side and right side of the U-shape sliding chute are respectively formed with a U-shape slide-way, wherein the buckle block is a rectangular block, with its one side having a buckling groove, wherein one side of the buckling groove is formed with a hook portion, wherein the other side of the buckling groove has a platform, with its center part having a round bore, wherein the buckle block is held inside the groove of the slider, so as to slide to and fro freely inside the groove of the slider, wherein the slide fixing block is a rectangular block, with its center part having a hole, wherein the periphery of the round hole is formed with an embedding portion, wherein the left and right sides of the slide fixing block respectively have a sliding rail, wherein the sliding rail is embedded inside the C-shape sliding chute of the slider, so as to slide to and fro freely inside the C-shape sliding chute of the slider, wherein the T-bar is in the shape of the letter T, wherein a top part of the T-bar has a T-shape head portion, wherein, at an appropriate position on a lower end of the T-bar, there is a rod portion, wherein, at an appropriate position above the rod portion, there is a threaded portion, wherein the left and right sides of the T-shape head portion respectively have a pulley portion, wherein the pulley portion is embedded inside the C-shape sliding chute of the slider, so as to slide to and fro freely inside the C-shape sliding chute of the slider, wherein the extruded aluminum frame is a long bar-shaped aluminum extrusion, with its one side having a C-shape groove portion, wherein the C-shape groove portion is coupled with the front end fixing platform of the slider to form an integral body and is fixed together with a screw, wherein the load-bearing cross bar is a long T-shaped aluminum extrusion, with its center part having a lug portion, wherein the center of the lug portion is formed with a hollow chute, wherein the two sides of the lug portion respectively have a supporting portion, wherein the slider is a long bar-shaped aluminum extrusion, with its center part having a groove, wherein the left and right sides of the groove respectively have a square groove, wherein, above each square groove, there is a C-shape sliding chute, wherein, above each C-shape sliding chute and at the front end, there is respectively a front end fixing platform, wherein, at the opposite rear end, there is a rear end fixing platform, wherein the rear end fixing platform is provided for placement of the supporting portion on one side of the load-bearing cross bar, wherein a screw is used to combine the slider and the load-bearing cross bar, wherein, above each front end fixing platform, there is respectively a platform protruding to the left and right, wherein, when the handle drives the buckle block to complete the buckling, the handle pulls the T-bar, drives the buckle block to be caught on the flange portion of the sidewall of the truck bed, and generates a downward pulling force, wherein the pulling force is transmitted by the slider to the load-bearing cross bar, wherein the load-bearing cross bar presses the extruded aluminum frame, wherein the whole tonneau cover frame made up of a plurality of extruded aluminum frames automatically generates a downward pressure, so that the tonneau cover frame is covered on the truck bed tightly.

The groove in the center of the slider holds the buckle locking device made up of the handle, the buckle block, the slide fixing block, and the T-bar assembled in a serial connection, so that the assembled buckle locking device is hidden inside the groove of the slider to form an integral body.

DETAILED DESCRIPTION OF THE INVENTION

For better understanding of the objects, efficacy, and structural features of the invention, detailed descriptions of the invention are provided below based on a preferred embodiment and with reference to the accompanying figures.

Figure 1:
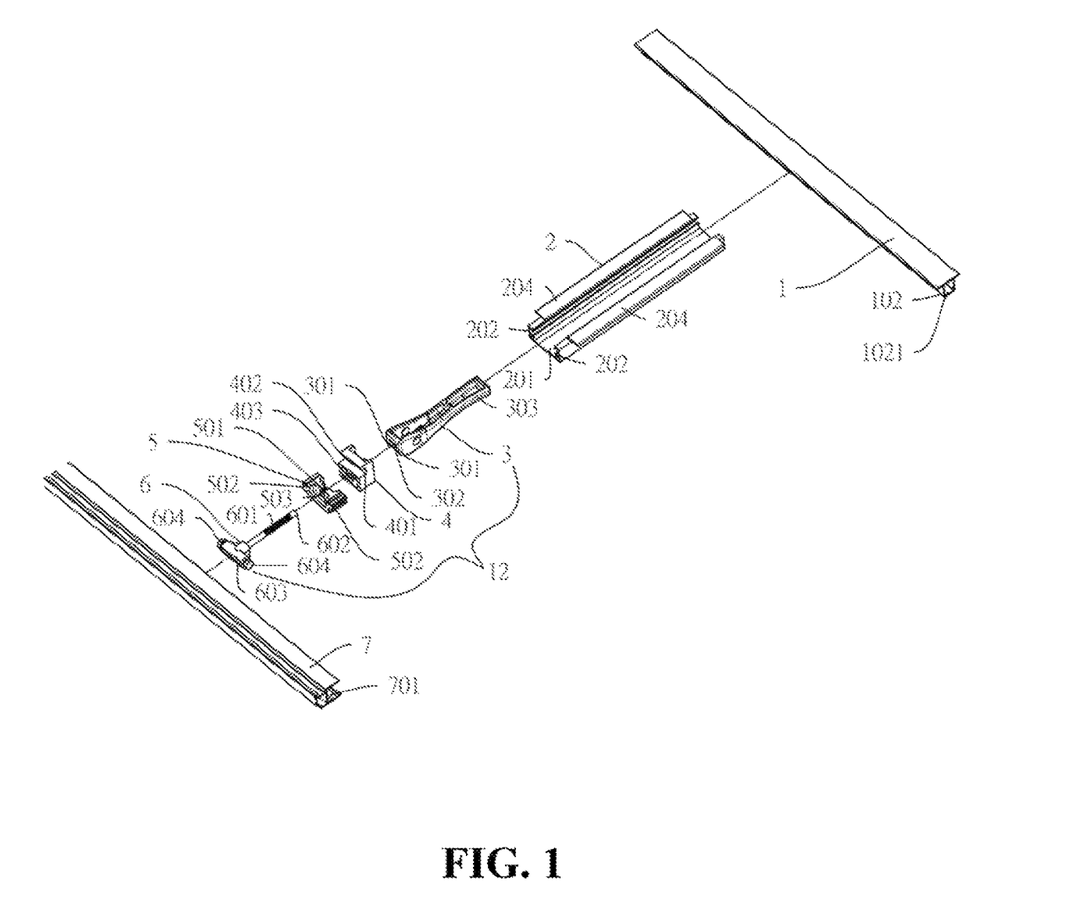
FIG. 1 is an exploded perspective view of the invention.
Figure 2A:
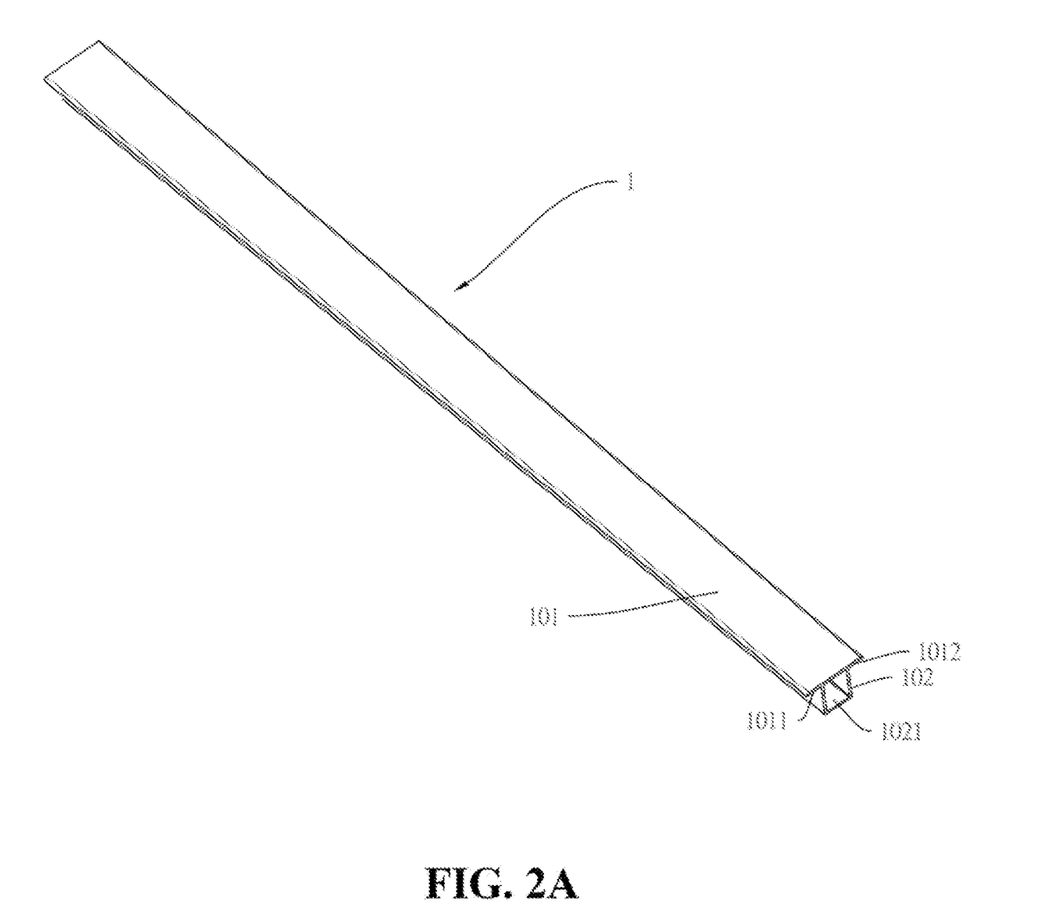
FIG. 2A is an enlarged view of the component cross bar of the invention.

Referring firstly to FIG. 1, the present invention is a buckle locking mechanism for the tonneau cover of pick-up trucks (II), mainly comprising a load-bearing cross bar 1, a slider 2, a handle 3, a buckle block 4, slide fixing block 5, a T-bar 6, and an extruded aluminum frame 7, wherein:

The load-bearing cross bar 1 (referring also to FIG. 2A) is a long T-shaped aluminum extrusion, with its center part having a lug portion 102. The center of the lug portion 102 is formed with a hollow chute 1021. The two sides of the lug portion 102 respectively have a supporting portion (1011, 1012).

Figure 2B:
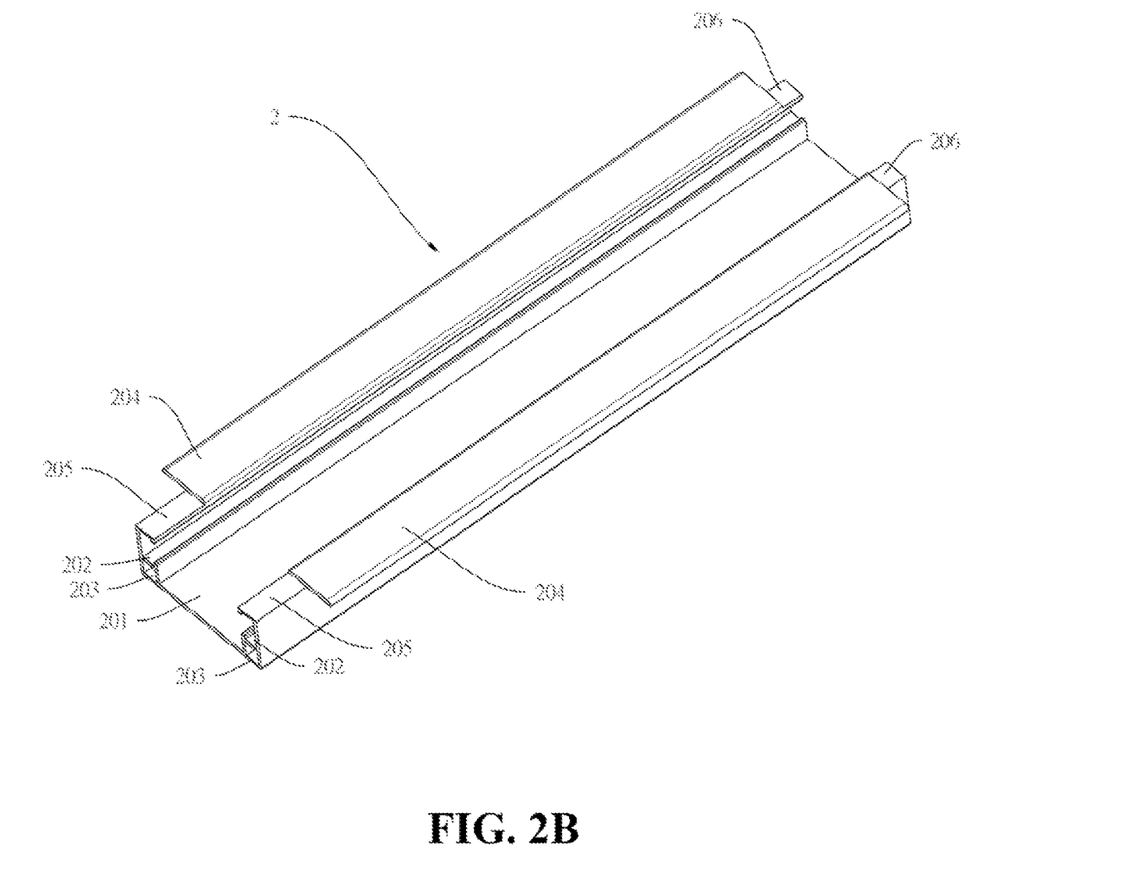
FIG. 2B is an enlarged view of the component slider of the invention.

The slider 2 (see FIG. 2B) is a long bar-shaped aluminum extrusion, with its center part having a groove 201. The left and right sides of the groove 201 respectively have a square groove 203. Above each square groove 203, there is a C-shape sliding chute 202. Above each C-shape sliding chute 202 and at the front end, there is respectively a front end fixing platform 205, and at the opposite rear end, there is respectively a rear end fixing platform 206. The rear end fixing platform 206 is provided for placement of the supporting portion 1011 on one side of the load-bearing cross bar 1. A screw mechanism can be used to combine the slider 2 and the load-bearing cross bar 1. Moreover, above each front end fixing platform 205, there is respectively a platform 204 protruding to the left and right.

The handle 3 is a long bar, with its top end having a U-shape sliding chute 302, extending downward until an appropriate position to be adjacent to the hand holding portion 303. The left side and right side of the U-shape sliding chute 302 are respectively formed with a U-shape slide-way 301.

The buckle block 4 is a rectangular block, with its one side having a buckling groove 401. One side of the buckling groove 401 is formed with a hook portion 402. The other side of the buckling groove 401 has a platform, with its center part having a round bore 403. The buckle block 4 can be held inside the groove 201 of the slider 2, so as to slide to and fro freely inside the groove 201 of the slider 2.

The slide fixing block 5 is a rectangular block, with its center part having a hole 503. The periphery of the round hole 503 is formed with an embedding portion 501. Moreover, the left and right sides of the slide fixing block 5 respectively have a sliding rail 502. The sliding rail 502 can be embedded inside the C-shape sliding chute 202 of the slider 2, so as to slide to and fro freely inside the C-shape sliding chute 202 of the slider 2.

The T-bar 6 is in the shape of the letter T, with its top part having a T-shape head portion 603, and at an appropriate position on its lower end, there is a rod portion 602. At an appropriate position above the rod portion 602, there is a threaded portion 601. The left and right sides of the T-shape head portion 603 respectively have a pulley portion 604. The pulley portion 604 can be embedded inside the C-shape sliding chute 202 of the slider 2, so as to slide to and fro freely inside the C-shape sliding chute 202 of the slider 2.

The extruded aluminum frame 7 is a long bar-shaped aluminum extrusion, with its one side having a C-shape groove portion 701. The C-shape groove portion 701 can be coupled with the front end fixing platform 205 of the slider 2 to form an integral body and be fixed together with a screw.

Figure 3:
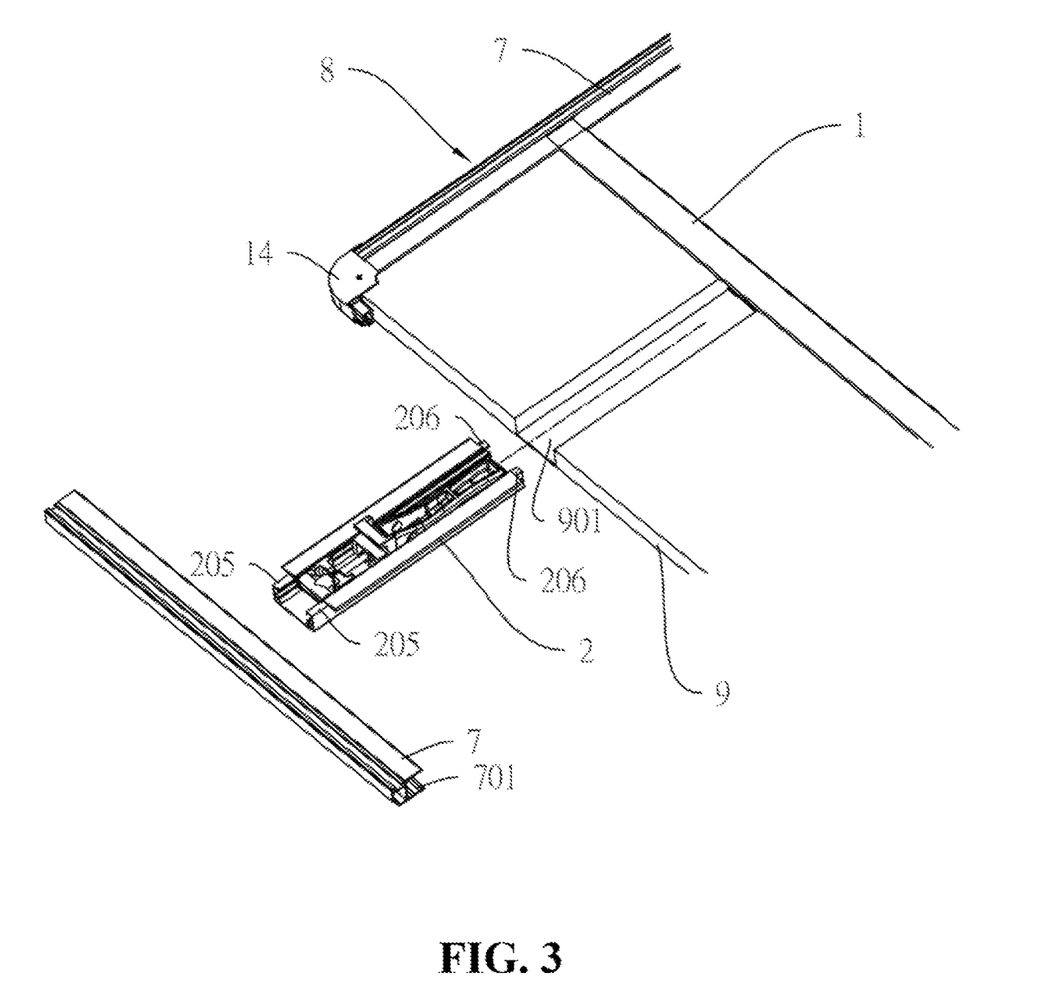
FIG. 3 is an exploded view of the tonneau cover frame of the invention.
Figure 4:
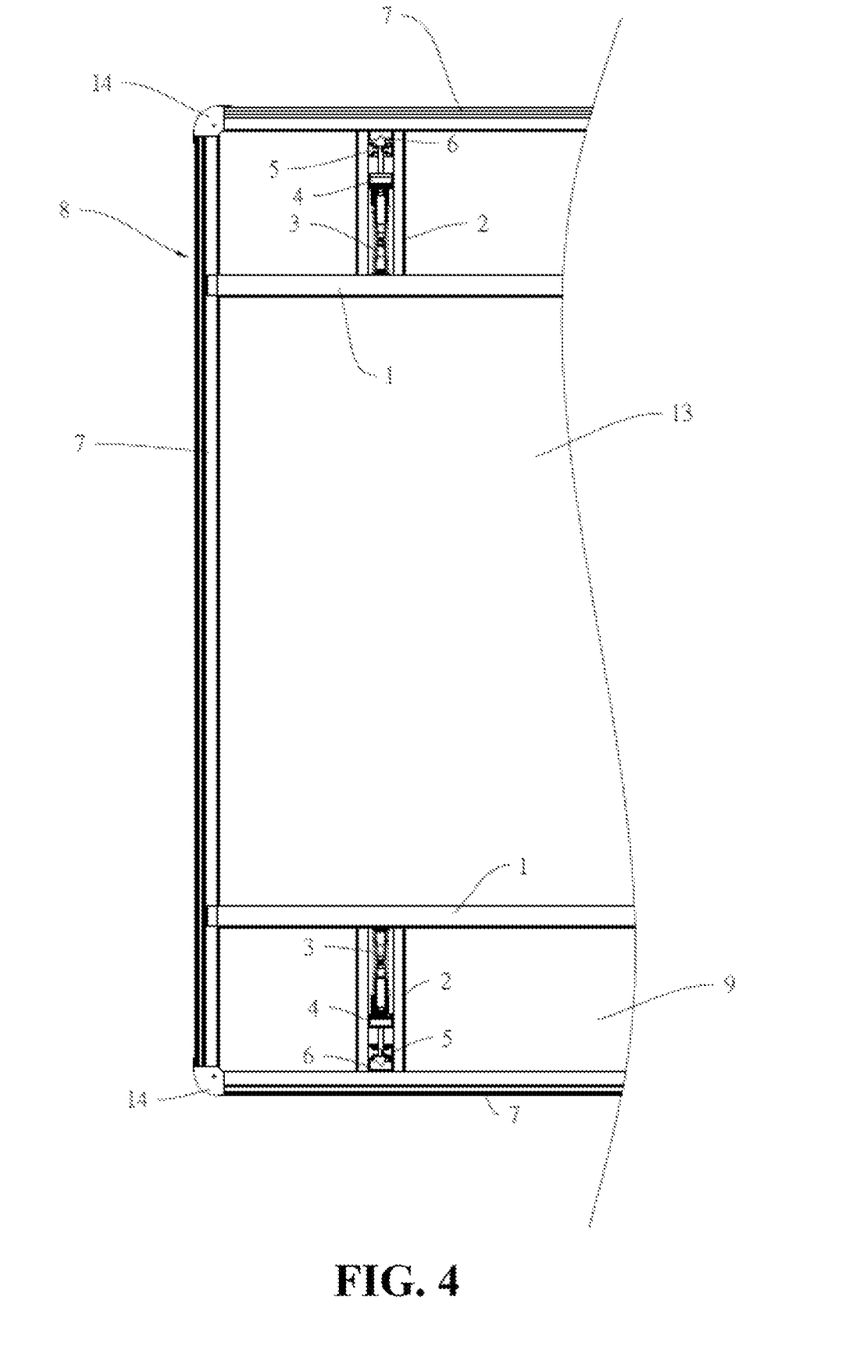
FIG. 4 is a plane view of the combined state of the invention.

When assembling, as shown in FIG. 1 and FIG. 3, firstly prepare the components of the buckle locking mechanism 12. Use a plurality of screws to combine the longer side of the plate body 9 having grooves 901 with the load-bearing cross bar 1, and combine the shorter side with the extruded aluminum frame 7 and the corner edge block 14. Then, fit the sequentially assembled buckle locking mechanism 12 into the C-shape sliding chute 202 of the slider 2 (i.e., the handle 3 and buckle block 4 is placed inside the groove 201, the pulley portion 604 of the T-bar 6 and the sliding rail 502 of the slide fixing block 5 is placed inside the C-shape sliding chute 202), and hide the whole buckle locking mechanism 12 inside the groove 201 of the slider 2 (see FIG. 3). Then, install the slider 2 fitted with the buckle locking mechanism 12 into the groove 901 of the plate body 9, embed the rear end fixing platform 206 of the slider 2 in the supporting portion 1011 of the load-bearing cross bar 1, and fix them together using screws. At last, couple the C-shape groove portion 701 of the extruded aluminum frame 7 with the front end fixing platform 205 of the slider 2, and also use screws to fix them together while coupling one end of the extruded aluminum frame 7 with the corner edge block 14. Now, the assembled structure as shown in FIG. 4 or FIG. 5 is completed.

Figure 5:
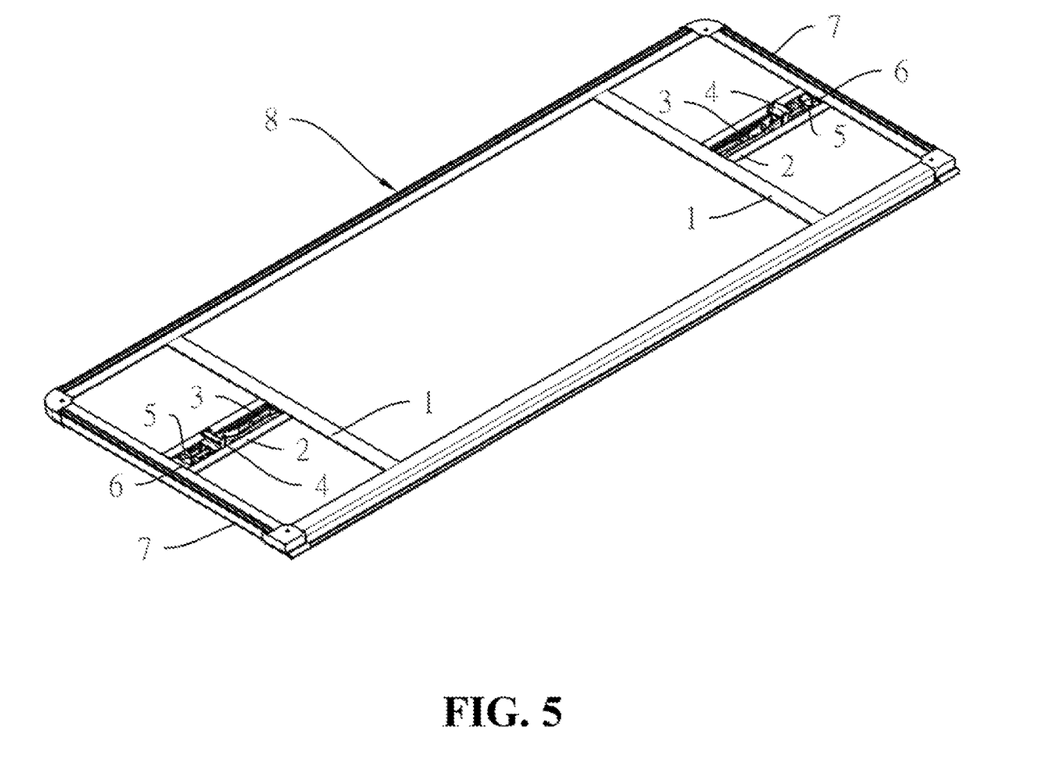
FIG. 5 is a perspective view of the combined state of the invention.
Figure 6:
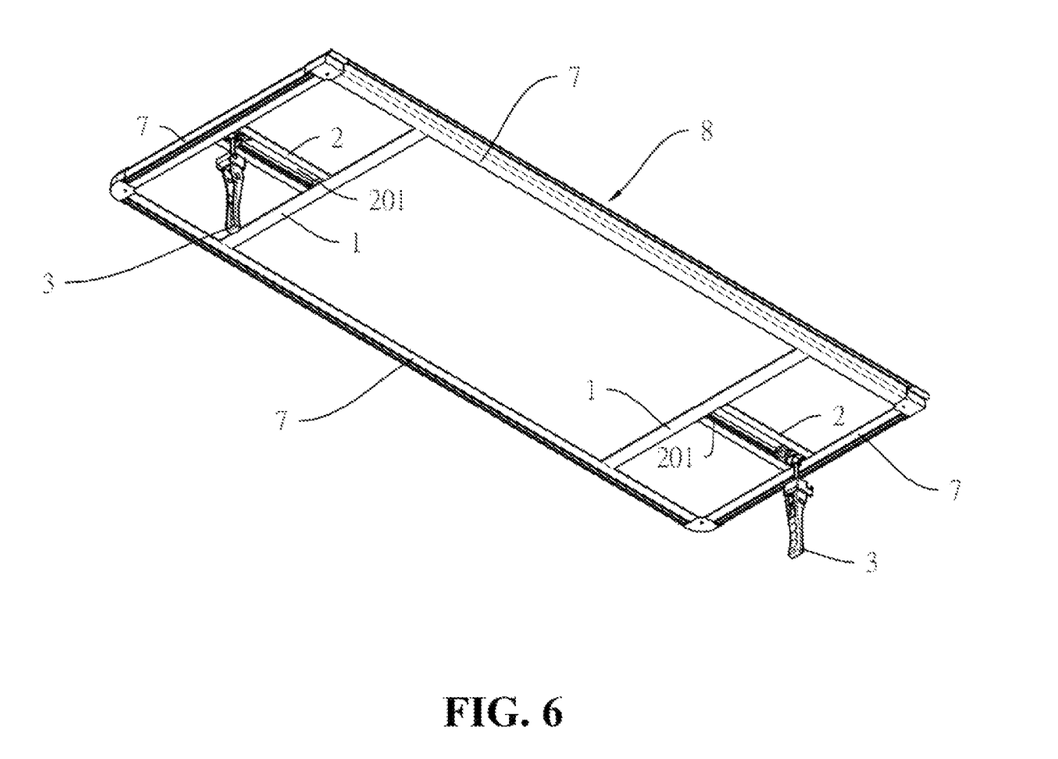
FIG. 6 is an operational view of the invention (I).
Figure 7:
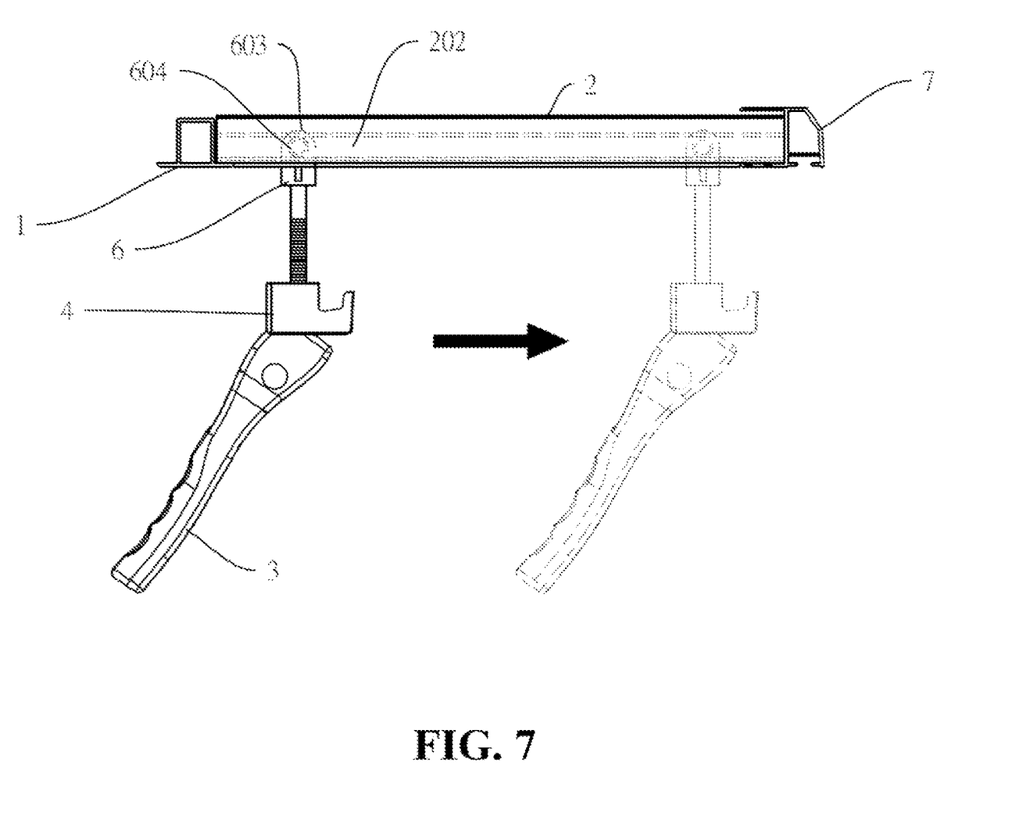
FIG. 7 is an operational view of the invention (II).
Figure 8:
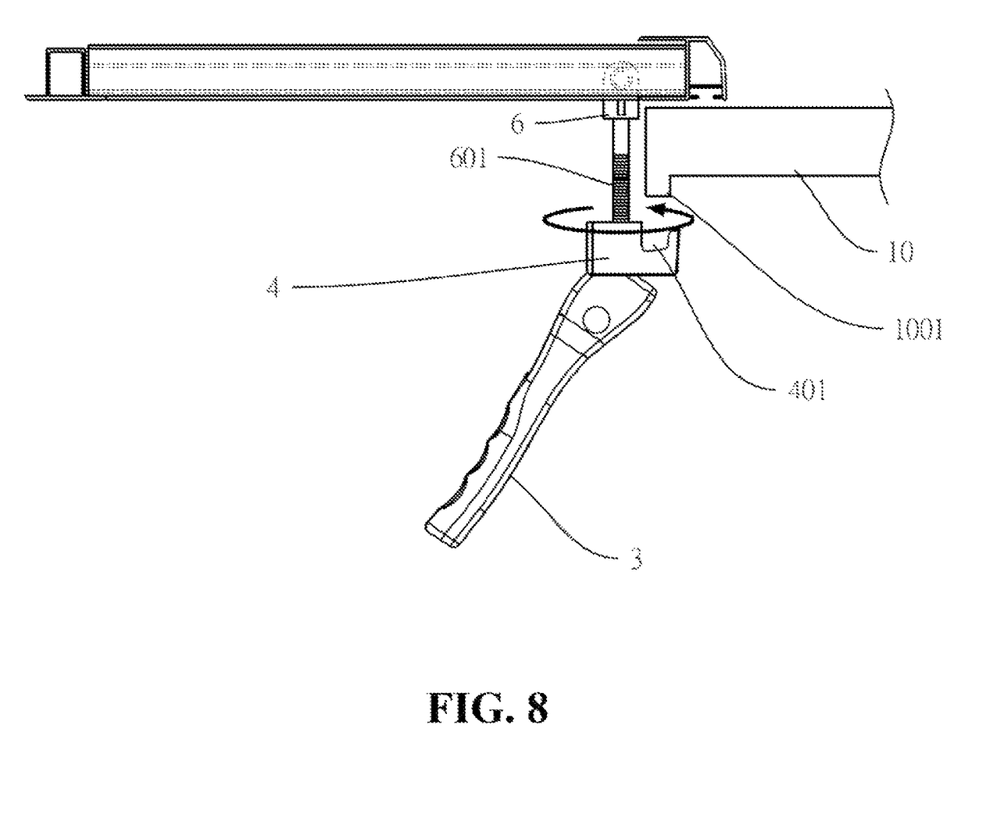
FIG. 8 is an operational view of the invention (III).
Figure 9:
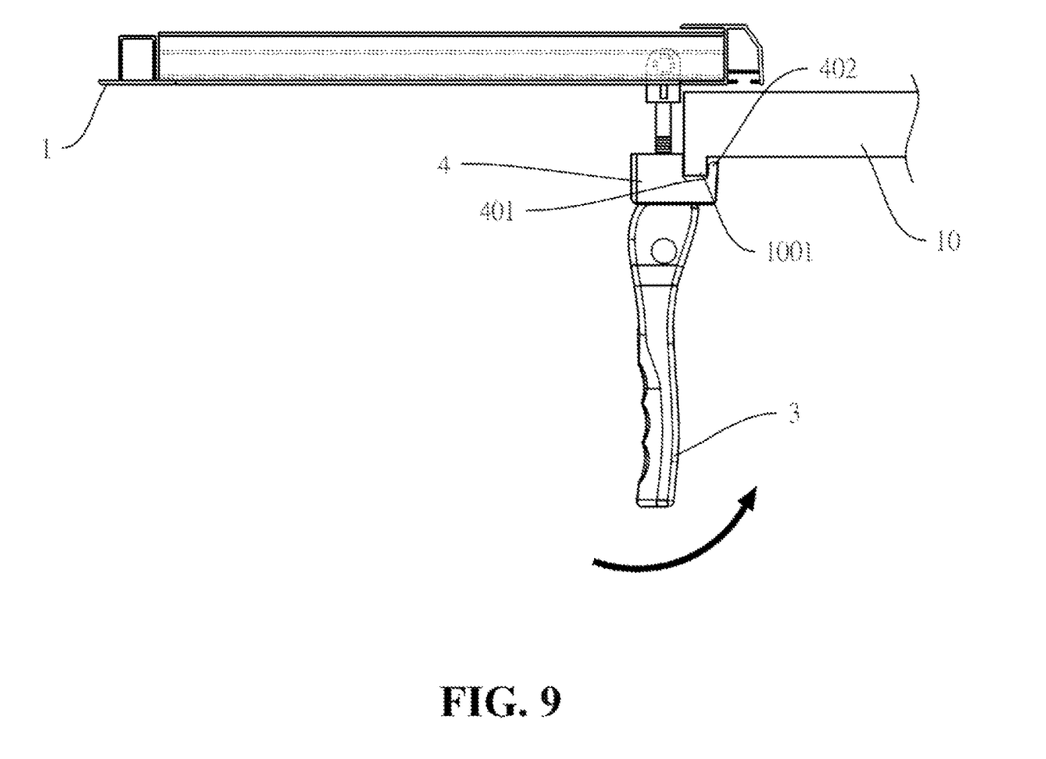
FIG. 9 is an operational view of the invention (IV).
Figure 10:
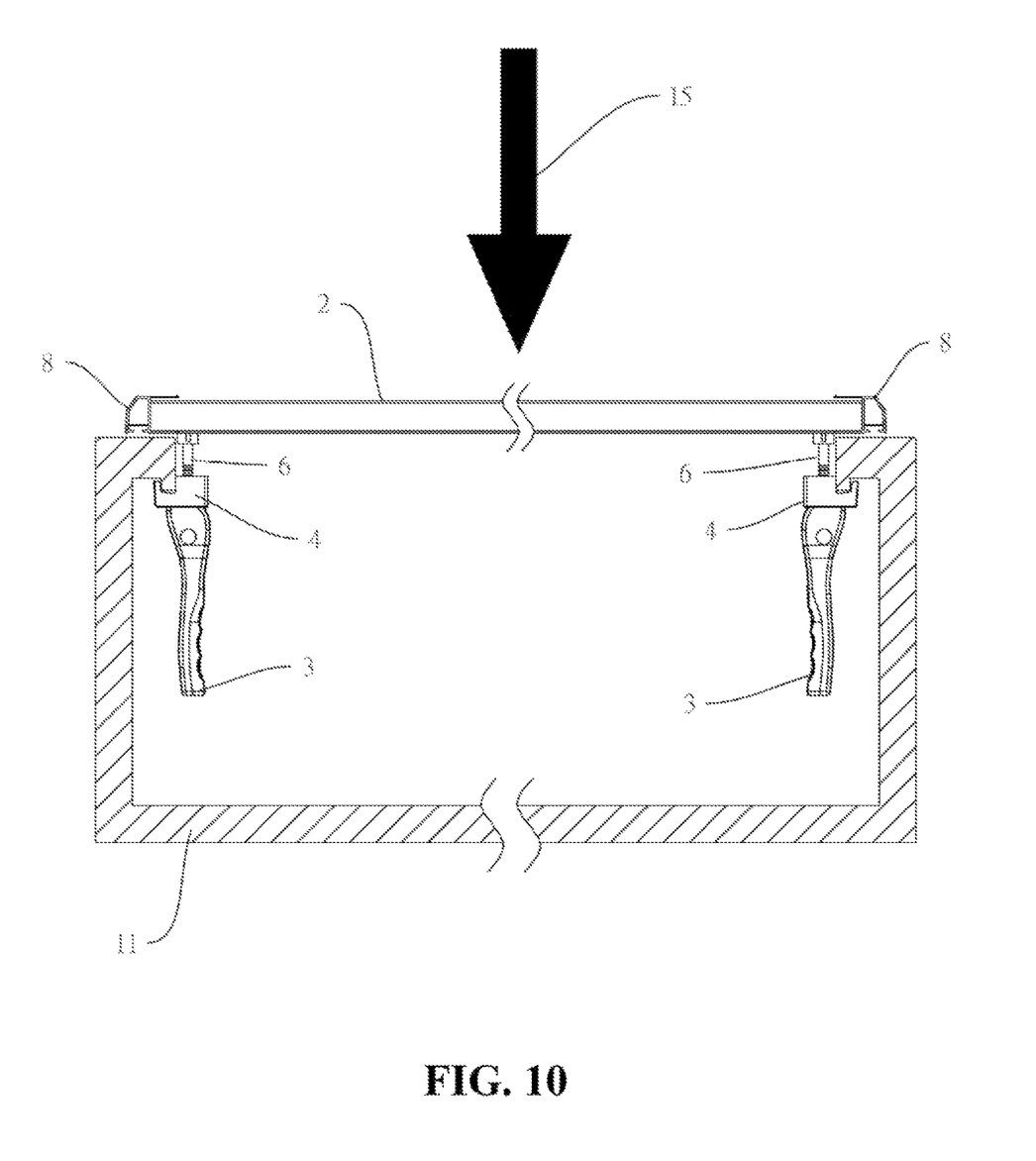
FIG. 10 is an operational view of the invention (V).

As the whole tonneau cover frame structure covering the truck bed is made up of a plurality of individual tonneau cover frames 8 as shown in FIG. 5 based on the size needed, in the present invention, the operation is described with respect to one single tonneau cover frame 8 only. Referring to FIG. 5 and FIG. 6, to use a tonneau cover frame 8 as shown in FIG. 10 to cover the truck bed of a pick-up truck tightly, firstly pull out the handle 3 hidden inside the slider 2, and make it perpendicular to the slider 2 at a 90-degree angle (as shown in FIG. 6). Then (referring to FIG. 7), based on the feature that the pulley portion 604 of the T-shape head portion 603 of the T-bar 6 can slide to and fro freely inside the C-shape sliding chute 202 of the slider 2, move the buckle block 4 to the buckling position. Referring to FIG. 8, after aligning the buckling groove 401 of the buckle block 4 to the flange portion 1001 of the truck bed sidewall, rotate the handle 3. Now the threaded portion 601 of the T-bar 6 can drive the buckle block 4 to move upward. When the buckle block 4 rises to a certain height and is caught on the flange portion 1001, press the handle 3 to the right, so that the handle 3 is perpendicular to the buckle block 4 (as shown in FIG. 9). When pressing the handle 3, the T-bar 6 will generate a downward pulling force. Through connection of the slider 2, the pulling force will be transmitted to the load-bearing cross bar 1 connected to the slider 2. Now the load-bearing cross bar 1 will transmit the pulling force toward the extruded aluminum frame 7 (as shown in FIG. 6) coupled on its two sides. When the handle 3 drives the buckle block 4 to complete the buckling action as shown in FIG. 10, the handle 3 will pull the T-bar 6 and consequently drives the buckle block 4 to be caught on the flange portion 1001 of the truck bed sidewall 10. Meanwhile, it will generate a downward pulling force. The pulling force will be transmitted by the slider 2 to the load-bearing cross bar 1. The load-bearing cross bar 1 will then press the extruded aluminum frame 7. As a result, the whole tonneau cover frame 8 made up of a plurality of extruded aluminum frames 7 will automatically generate a downward pressure 15, and the tonneau cover frame 8 can cover the truck bed more tightly.

To conclude, the buckle locking mechanism for the tonneau cover of pick-up trucks (II) according to the present invention is meticulously designed by the inventor to offer a unique and simple buckling mechanism that can be used conveniently. It features creative design and easy assembly. Moreover, it can automatically generate a downward pressure for the tonneau cover frame to cover the truck bed tightly. It truly meets all the prerequisites for patent of invention, and therefore a patent application is submitted in accordance with the patent law.

Although the invention has been explained in relation to its preferred embodiment, it is to be understood that many other possible modifications and variations can be made without departing from the spirit and scope of the invention as hereinafter claimed.

[Symbol description]

| | |
|---|---|
| 1 . . . load-bearing cross bar | 101 . . . top end platform |
| 1011 . . . supporting portion | 1012 . . . supporting portion |
| 102 . . . lug portion | 1021 . . . hollow chute |
| 2 . . . slider | 201 . . . groove |
| 202 . . . C-shape sliding chute | 203 . . . square groove |
| 204 . . . platform | 205 . . . front end fixing platform |
| 206 . . . rear end fixing platform | |
| 3 . . . handle | 301 . . . U-shape slide-way |
| 302 . . . U-shape sliding chute | 303 . . . hand holding portion |
| 4 . . . buckle block | 401 . . . buckling groove |
| 402 . . . hook portion | 403 . . . cylindrical bore |
| 5 . . . slide fixing block | 501 . . . embedding portion |
| 502 . . . sliding rail | 503 . . . hole |
| 6 . . . T-bar | 601 . . . threaded portion |
| 602 . . . rod portion | 603 . . . T-shape head portion |
| 604 . . . pulley portion | |
| 7 . . . extruded aluminum frame | 701 . . . C-shape groove portion |
| 8 . . . tonneau cover frame | |
| 9 . . . plate body | 901 . . . groove |
| 10 . . . truck bed sidewall | 1001 . . . flange portion |
| 11 . . . truck bed | |

[Symbol description]

| | |
|---|---|
| 12 . . . buckle locking mechanism | |
| 13 . . . long plate body | |
| 14 . . . corner edge block | |
| 15 . . . pressure | |
| 1 . . . load-bearing cross bar | 102 . . . lug portion |
| 1021 . . . hollow chute | |
| 2 . . . slider | 201 . . . groove |
| 202 . . . C-shape sliding chute | 203 . . . square groove |
| 3 . . . handle | 301 . . . U-shape slide-way |
| 302 . . . U-shape sliding chute | 303 . . . hand holding portion |
| 4 . . . buckle block | 401 . . . buckling groove |
| 402 . . . hook portion | 403 . . . round bore |
| 5 . . . slide fixing block | 501 . . . embedding portion |
| 502 . . . sliding rail | 503 . . . hole |
| 6 . . . T-bar | 601 . . . threaded portion |
| 602 . . . rod portion | 603 . . . T-shape head portion |
| 604 . . . pulley portion | |
| 7 . . . extruded aluminum frame | 701 . . . C-shape groove portion |

What is claimed is:

1. A buckle locking device for a tonneau cover of a pick-up truck (II), comprising:

a load-bearing cross bar (1), a slider (2), a handle (3), a buckle block (4), a slide fixing block (5), a T-bar (6), and an extruded aluminum frame (7), wherein the handle is a long bar extending downward to a hand holding portion, wherein a U-shape sliding chute is provided at a top end of the handle, wherein each of a left side and a right side of the U-shape sliding chute (302) is formed with a U-shape slide-way, wherein the buckle block (4) is a rectangular block, wherein a buckling groove (401) is provided on one side of the buckle block, wherein one side of the buckling groove is formed with a hook portion (402), wherein the other side of the buckling groove has a platform (204), wherein a center part of the buckling groove has a round bore (403), wherein the buckle block (4) is held inside a center groove (201) of the slider (2), so as to slide to and fro freely inside the center groove (201) of the slider (2), wherein slide fixing block (5) is a rectangular block, wherein a center part of the slide fixing block (5) has a hole, wherein the periphery of the hole is formed with an embedding portion, wherein a sliding rail (502) is provided on each of left and right sides of the slide fixing block (5), wherein the sliding rail is embedded inside a C-shape sliding chute (202) of the slider, so as to slide to and fro freely inside the C-shape sliding chute of the slider, wherein the T-bar is in the shape of the letter T, wherein a top part of the T-bar has a T-shape head portion, wherein a rod portion (602) is provided at a lower end of the T-bar, wherein, at the rod portion, there is a threaded portion, wherein each of left and right sides of the T-shape head portion has a pulley portion, wherein the pulley portion is embedded inside the C-shape sliding chute of the slider, so as to slide to and fro freely inside the C-shape sliding chute of the slider, wherein the extruded aluminum frame is a long bar-shaped aluminum extrusion, wherein one side of the extruded aluminum frame has a C-shape groove portion, wherein the C-shape groove portion is coupled with a front end fixing platform of the slider to form an integral body and is fixed together with a screw, wherein the load-bearing cross bar is a long T-shaped aluminum extrusion, wherein a center part of the load-bearing cross bar has a lug portion, wherein a center of the lug portion is formed with a hollow chute, wherein each of two sides of the lug portion has a supporting portion, wherein the slider is a long bar-shaped aluminum extrusion, wherein the center groove (201) is formed in a center part of the slider (204), wherein a square groove (203) is formed at each of left and right sides of the center groove (201), wherein, the C-shape sliding chute (202) is formed over the square groove (203), wherein, a front end fixing platform (205) is provided over the C-shape sliding chute (202) and at the front end of the slider (2), wherein, at a rear end of the slider (2), there is a rear end fixing platform (206), wherein the rear end fixing platform (206) is provided for placement of a supporting portion on one side of the load-bearing cross bar (1), wherein a screw combines the slider (2) and the load-beating cross bar (1), wherein the front end fixing platform (205) includes a left front end fixing platform and a right front end fixing platform, wherein a left platform protruding in a left direction is provided over the left front end fixing platform, wherein a right platform protruding in a right direction is provided over the right front end fixing platform, wherein, when the handle drives the buckle block to complete the buckling, the handle pulls the T-bar, drives the buckle block to be caught on a flange portion of a sidewall of a truck bed, and generates a downward pulling force, wherein the pulling force is transmitted by the slider to the load-bearing cross bar, wherein the load-bearing cross bar presses the extruded aluminum frame (7), wherein a tonneau cover frame made up of a plurality of extruded aluminum frames automatically generates a downward pressure, so that the tonneau cover frame is covered on the truck bed tightly.

2. The buckle locking device according to claim 1, wherein the center groove (201) in the center of the slider holds the buckle locking device made up of the handle, the buckle block, the slide fixing block, and the T-bar assembled in a serial connection, so that the assembled buckle locking device is hidden inside the center groove (201) of the slider to form an integral body.

* * * * *